May 5, 1959     G. D. CHAPMAN     2,884,810
REVERSIBLE VARIABLE SPEED DRIVE
Filed April 27, 1954     3 Sheets-Sheet 1

Inventor:
Gordon D. Chapman
By Warren P. Horton
Atty.

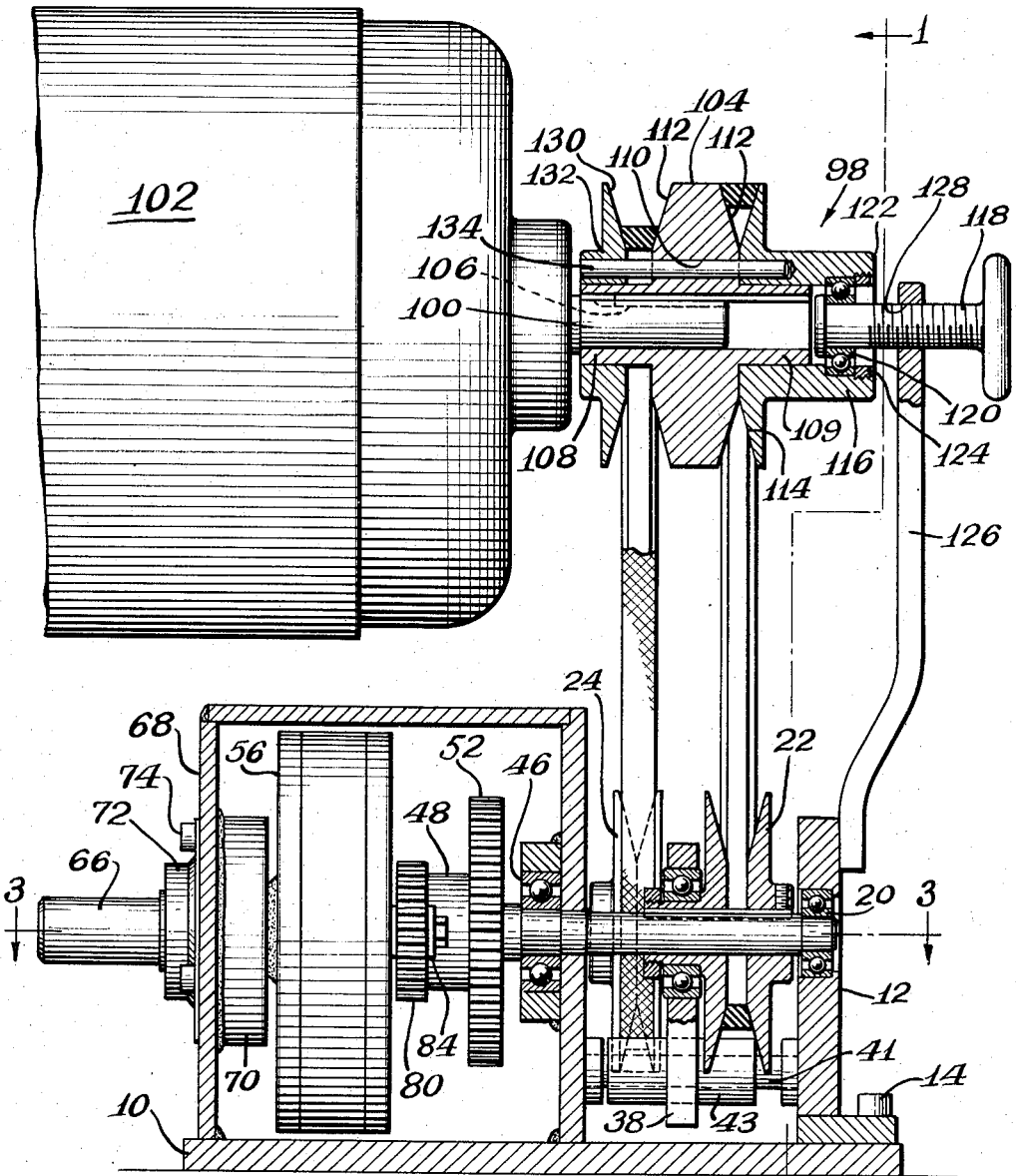

May 5, 1959
G. D. CHAPMAN
2,884,810
REVERSIBLE VARIABLE SPEED DRIVE
Filed April 27, 1954
3 Sheets-Sheet 3
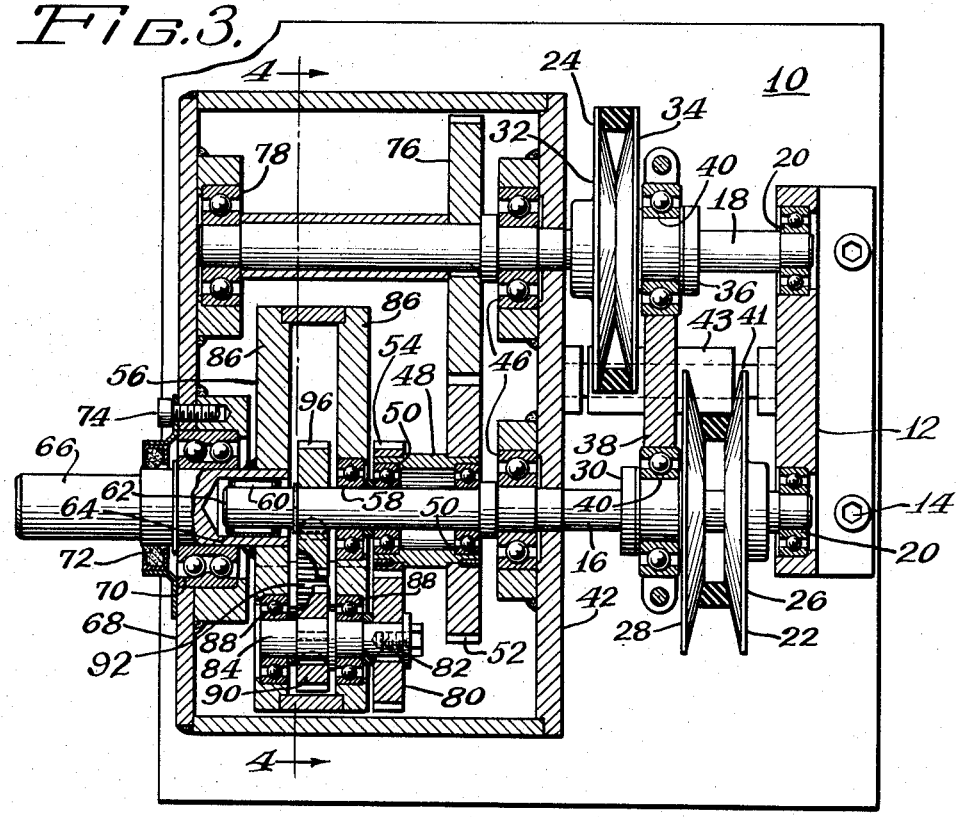
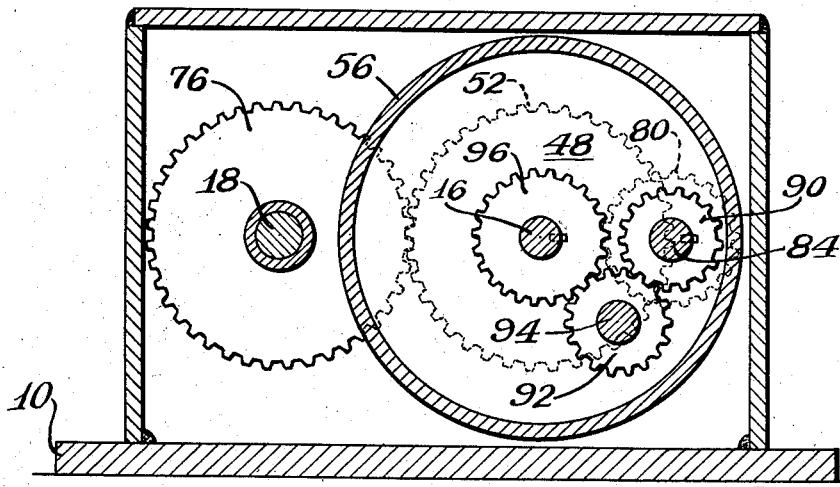
Inventor.
Gordon D. Chapman
By Warren C. Horton
Atty.

United States Patent Office 2,884,810
Patented May 5, 1959

2,884,810
REVERSIBLE VARIABLE SPEED DRIVE

Gordon D. Chapman, Columbia City, Ind.

Application April 27, 1954, Serial No. 425,879

3 Claims. (Cl. 74—689)

My invention relates to a reversible variable speed drive.

Although continuously variable speed drives have been known for some time and many arrangements have been employed to obtain this result, there are in all such arrangements I have seen certain detrimental attributes which go to their strength, lubrication, range of variation or wear characteristics. My invention has as a primary object the meeting of these several difficulties found in the contrivances hitherto known. More specifically, I provide a drive which is characterized by the absence of any gear directly mounted on the output shaft and by an extremely moderate tooth load.

Another characteristic of my drive is that all the gears therein may be either spur or helical and consequently substantially simpler and less expensive.

Still another characteristic is that all the gears thereof are enclosed within an oil filled gear box, thus insuring optimum lubrication.

Other objects and advantages of my invention will be apparent from the following description and drawings, of which:

Fig. 2 is a section which may be regarded as being taken substantially along the line 2—2 of Fig. 1, looking in the direction of the arrows;

Fig. 3 is a section which may be regarded as being taken substantially along the line 3—3 of Fig. 2, looking in the direction of the arrows; and Fig. 4 is a section which may be regarded as being taken substantially along the line 4—4 of Fig. 3, looking in the direction of the arrows.

Figure 1:
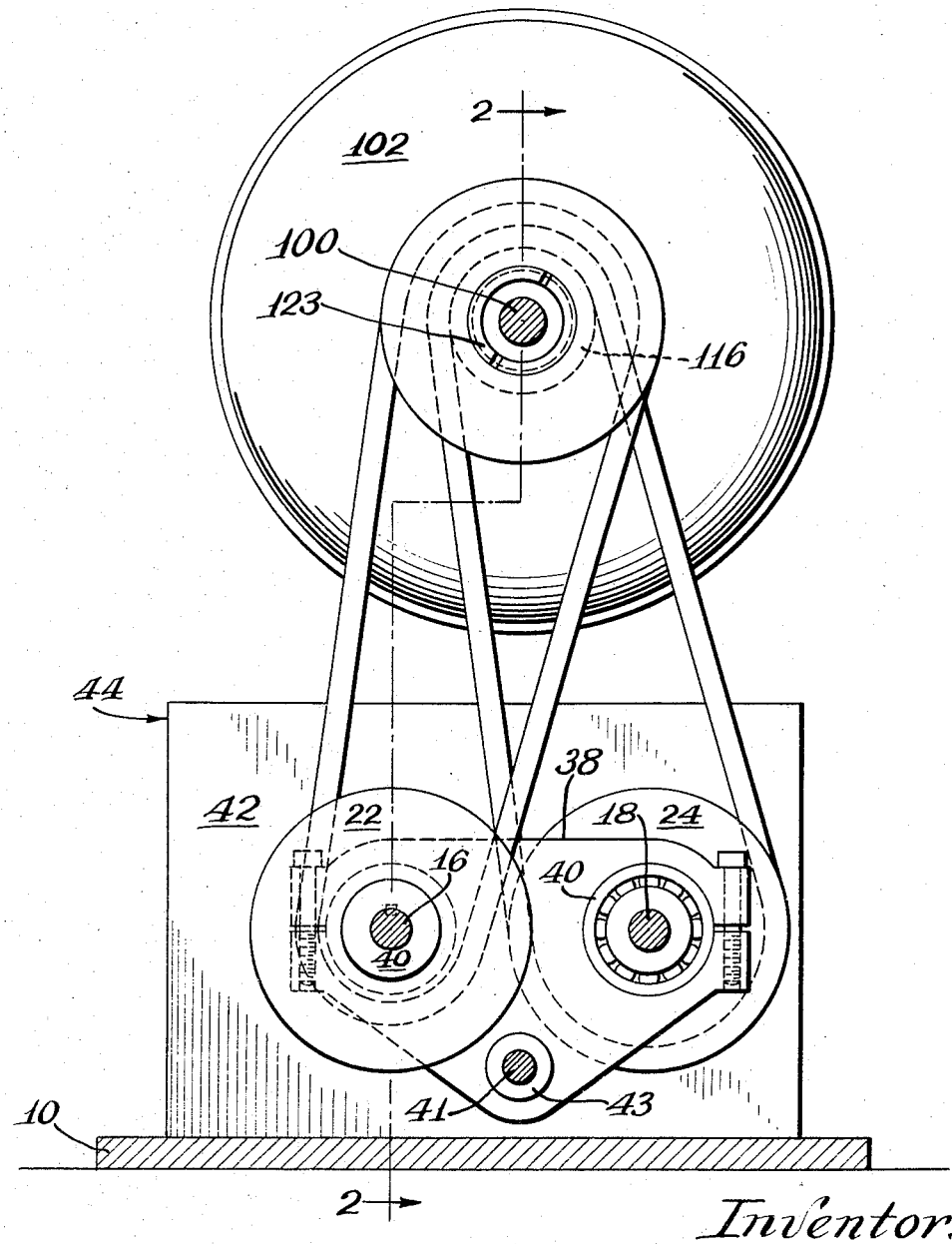
Fig. 1 is a front elevation of an embodiment of my variable speed drive, being driven by a motor and showing the interconnecting belts.

The illustrated embodiment of my invention is mounted generally on a rectangular base 10. An upstanding plate 12 is bolted at its lower end 14 to the base 10 and the ends of two shafts 16 and 18 are rotatably carried by bearings 20 in bores in the plate 12. Each of the shafts has mounted thereon adjustable V-belt pulleys 22 and 24 respectively. Pulley 22 has the outer face 26 thereof fixed to the shaft 16 and the inner face 28 is carried by a collar 30 which is slidably keyed on the shaft 16. In the case of the pulley 24 on the second shaft 18, the inner face 32 is fixed relative to that shaft. The outer face 34 is carried on a collar 36 which likewise is slidably keyed on the shaft 18. A yoke 38 interconnects the collars 30 and 36 by means of bearing-equipped openings 40 containing the collars. Movement of the yoke, thus, longitudinally of the shafts will have the effect of diminishing the effective radius of one of the pulleys and simultaneously increasing the effective radius of the other.

Inside the pulleys, the shaft's extend through the removable back wall 42 of a gear box 44 which need be nothing more than a rectangular cast or welded enclosure fixed to the base 10. A yoke guide rod 41 also may extend between the plate 12 and the back wall 42, and the yoke 38 has a sleeve 43 secured therein which rides on the rod 41, maintaining the yoke in plane and limiting its movement.

The shafts are journaled in bearings 46 mounted on the wall 42. The points of entry of these shafts may be furnished with packing glands if desired to prevent the escape of oil. Interiorly of the box, shaft 16 carries a double gear 48 which is rotatably mounted relative to shaft 16 on bearings 50 and includes a gear 52 and a pinion 54. Inwardly of the member 48, a drum 56 is likewise rotatably mounted on shaft 16 by means of ball bearings 58 and needle bearings 60 adjacent the end 62 of the shaft. The needle bearings 60 are mounted in the hollow end 64 of an output shaft 66 which extends out of the front wall 68 of the box 44. The output shaft 66 is rotatable in bearings 70 mounted in the front wall 68 of the box and extends through a packing gland and bearing retainer 72 secured by screws 74 to the exterior of the wall 68. The inner end 62 of the shaft 16 is thus well supported relative to the wall 68 by virtue of its mounting within the hollow end 64 of the output shaft 66 which in turn is supported by the bearings 70.

Shaft 18 has a gear 76 keyed thereto in mesh with gear 52 on shaft 16. The remote end of shaft 18 is supported in bearings 78 on the front wall 68 of the box 44.

The pinion 54 of the gear member 48 is meshed with a gear 80 which is keyed to the protruding end 82 of an axle 84 extending between the parallel walls 86 of the drum 56 and journaled for rotation therein on bearings 88. A pinion 90 is keyed to axle 84 interiorly of the drum. Pinion 90 is in mesh with a reverse idler 92 which is rotatably mounted on an idler shaft 94 which also extends between the parallel walls 86 of the drum 56. The reverse idler in turn is in mesh with a gear 96 keyed to shaft 16.

I contemplate an adjustable double pulley 98 to be used on the shaft 100 of the motor 102 which powers my device. This pulley includes a central member 104 which is directly attached as by key 106 to the shaft 100 and which provides the outer face for the inner pulley and the inner face for the outer pulley. This member has tubular collars 108 and 109 extending respectively inwardly and outwardly of the central aperture thereof and has a plurality of bores 110 therethrough radially outside of the collars 108 and 109 but inside of the inclined pulley faces 112. The outer face 114 of the outer pulley is formed on a tubular sleeve 116 which fits over and is slidable on the collar 109. An adjustment screw 118 is rotatably secured in bearings 120 in the outer end 122 of the sleeve 116, the bearings, in turn being secured in place by a tubular internal nut 124. A post 126 affixed to some stationary object such as the upstanding plate 12 has a threaded hole 128 therein engaging the screw 118. Thus, turning the screw 118 has the effect of shifting the position of the sleeve 116 on the collar 109. At the same time, however, by virtue of the bearings 120, the sleeve 116 may turn freely and independently of the screw 118.

The inner face 130 of the inner pulley is formed on a sleeve 132 which is slidable on the collar 108. Rods 134 are fixed at each end to the sleeves 116 and 132 which extend through and are slidable in bores 110. The sleeves thus moving together as the screw 118 is adjusted and the member 104 being stationary, as the effective diameter of one of the pulleys is increased, the effective diameter of the other is diminished.

The motor 102 may be supported in any well-known fashion so as to be adjustably fixed with reference to the speed changer as illustrated.

The operation of my device can be readily understood from the foregoing description. Assuming 1 to 1 ratios in the gears throughout, or in other words all meshing gears have the same number of teeth, and a setting of the motor pulley so that the effective radii of the inner and outer belt pulleys is the same, the yoke 38 will shift so that the pulleys 22 and 24 of the speed changer are likewise the same. This will have the effect of driving both the shafts 16 and 18 in, for instance, a clockwise direction (viewing Fig. 1) at the same speed. Thus, gear 76, rotating clockwise, drives gear 52 of the double gear 48 counterclockwise about shaft 16 which is rotating clockwise and the angular velocities will be the same. Pinion 54 of the double gear 48, therefore, drives gear 80 which is mounted on axle 84, pinion 90 being also keyed to axle 84 interiorly of the drum, thus drives the reverse idler 92. Were shaft 16 and consequently gear 96 stationary, the consequent counterclockwise rotation of the reverse idler 92 would produce then a counterclockwise rotation of the drum 56. However, under the conditions assumed shaft 16 and shaft 96 are rotating in a clockwise direction at the same velocity as the reverse idler is rotating in a counterclockwise direction and therefore the drum 56, and hence the output shaft 66, will remain stationary.

As the adjustment screw 118 of the motor pulley is changed to the circumstance illustrated in the drawings where the speed of shaft 16 is increased and the speed of shaft 18 is decreased, the effect will be that gear 96 is traveling clockwise at a relatively high rate of speed whereas the reverse idler 92 is traveling counterclockwise at a relatively low rate of speed. As a consequence, the drum and output shaft will turn in a clockwise direction.

Likewise, as the adjustment screw 118 is changed in the other direction to decrease the speed of shaft 16 and increase the speed of shaft 18, gear 96 will travel relatively slowly and the reverse idler 92 traveling counterclockwise will move at a relatively high rate of speed. In such case, the drum and output shaft will turn in a counterclockwise direction. It will be appreciated that the closer the pulleys are to equal diameter the more slowly the output shaft will turn.

Other variances in speed can be obtained from using gears with different ratios throughout my mechanism. Thus, a substitution for the intermeshing gears 52 and 76 of gears other than in a 1–1 ratio will vary the effects of my device. Enlarging gear 76 and decreasing gear 52 would have the effect of accelerating the velocity of the reverse idler 92 so switching the range of speeds in the counterclockwise direction to make possible a higher rate of counterclockwise speed but a correspondingly decreased rate of clockwise speed.

I have found that with the conventional 1750 R.P.M. motor, the speed changer being approximately to scale with the motor as illustrated, I can obtain an output shaft speed of 1182 R.P.M. in either direction. Changing the ratio between the gears 76 and 52 would merely shift the total velocity range in either the clockwise or counterclockwise direction to zero speed.

I anticipate wide spread application of my invention. The advantage of a variable speed drive is, of course, well-known for machine tools and the like. It will have application in light conveyor systems where it may be desirable to vary constantly the velocity of travel. A particular instance which occurs to me where my device would be most suitable would be in the case of tumbling where it is desirable that provision be made to stop a tumbling drum with the door on top for charging and the like, for stopping it with the door on the bottom to empty it, for oscillating the drum back and forth to shake out the contents thereof, or to drive it over a range of speeds.

The lubrication advantages of my device can be appreciated from the foregoing description. The adjustable pulleys are the only components which lie outside of the box 44. In other words, the box 44 may be substantially filled with oil so that all the gears are continuously running in an oil bath. Another factor which should be appreciated is that there is no gear directly on the output shaft of my invention. The output shaft is driven directly by the drum 56 which in turn is moved about shaft 16 by axle 84 which can be a member of great strength. It will also be seen that all of the gears involved in my invention are traveling at high rates of speed. The differentiation of speed which determines the velocity of the output shaft is made at the point of drum drive. Thus, in the illustrated embodiment all the gears of the gear train interconnecting shaft 18 with the reverse idler 92 are traveling at the speed of shaft 18 or in other words, not far from the velocity of rotation of the electric motor. Likewise, gear 96 travels together with shaft 16. This high velocity in the gears makes possible the transmission of high power with extremely moderate tooth loads. It will be appreciated that the speed changer above described is merely illustrative and is not to be considered as being limitative of my invention. Many structural alternatives have been set forth in the description above and others will be evident to persons skilled in this art.

Thus, although I have shown a unit which includes two shafts separately driven by the motor, it will be appreciated that only one shaft may be directly driven by the motor and the second shaft by the first, the inversely variable pulley connecting the two shafts. Since the rotational velocity of my drive is dependent on the difference in rotational velocity between the shafts and not on the input speed, it will be appreciated that the consequences will be the same. This being the case, it will also be evident that an integral drive lies within the scope of my invention where one of the shafts may be integral and continuous with the motor shaft.

It will further be appreciated that although my device has been described generally in terms of power transmission through gears, other transmitting media may be employed, such as friction disks in the instance of phonograph drives, for example, for which my speed changer is particularly well suited and where gears, etc. have been defined in the claims, I wish it understood that these other alternatives are within the contemplation of this language.

I claim:

1. A reversible, variable speed drive comprising a motor, a double pulley on the shaft of said motor having inversely variable grooves, means for varying said grooves, and a speed changing mechanism including a gear case, a pair of spaced, parallel shafts journalled for rotation in said case and extending outwardly from one wall of said case, a variable diameter shaft pulley on each of said shafts, belts separately connecting each of said shaft pulleys to said motor pulley, said shaft pulleys varying inversely with the variation of the respective associated grooves of the motor pulley, and, inside said gear case, a gear fixed to the first of said shafts, a member mounted for rotation on said shaft and rotatably supporting a second gear in mesh with said first gear, an output shaft on said member in axial alignment with said first shaft journalled in the opposite wall of said gear case and extending outwardly from said case, a gear axle rotatably mounted to said member having a pair of pinions thereon, one of said pinions meshing with said second gear, a third gear rotatably mounted on said first shaft meshing with the other of said pinions and a fourth gear mounted on said second shaft driving said third gear.

2. A reversible, variable speed drive comprising a motor, a double pulley on the shaft of said motor having inversely variable grooves, means for varying said grooves, and a speed changing mechanism including a gear case, a pair of spaced, parallel shafts journalled for rotation in said case and extending outwardly from one wall of said case, a variable diameter shaft pulley on each of said shafts exteriorly of said gear case, belts separately connecting each of said shaft pulleys to said motor pulley, said shaft pulleys varying inversely with the variation of the respective associated grooves of the motor pulley, and, inside said gear case, a drum rotatably mounted on the first of said shafts at the end thereof to enclose and rotatably support said end, said drum including a stub axle projecting axially therefrom in axial alignment with said shaft through the opposite wall of said gear box and journalled for rotation therein, said stub axle constituting an output shaft, a gear fixed to said first shaft inside said drum, a second gear meshing with said first gear mounted on an axle extending between the walls of said drum, a second gear axle rotatably mounted in one wall of said drum having pinions at each end thereof, one inside and the other outside said drum, the inside pinion meshing with said second gear, a third gear rotatably mounted on said first shaft meshing with said outside pinion and a fourth gear mounted on said second shaft driving said third gear.

3. The combination as set forth in claim 2, wherein said third gear includes a sleeve rotatably mounted on said first shaft, said sleeve having also a fifth gear thereon meshing with said fourth gear.

References Cited in the file of this patent

UNITED STATES PATENTS

| | | |
|---|---|---|
| 844,748 | Riddell | Feb. 19, 1907 |
| 2,245,392 | Drill | June 10, 1941 |
| 2,359,526 | Locke | Oct. 3, 1944 |
| 2,618,175 | Bruce | Nov. 18, 1952 |

FOREIGN PATENTS

| | | |
|---|---|---|
| 730,233 | France | May 9, 1932 |
| 920,459 | France | Jan. 4, 1947 |